3,021,194
PRODUCTION OF AMMONIUM HYDROGEN FLUORIDE

George L. Cunningham, Burtonsville, Md., assignor to W. R. Grace & Co., New York, N.Y., a corporation of Connecticut
No Drawing. Filed Jan. 16, 1959, Ser. No. 787,116
9 Claims. (Cl. 23—88)

This invention relates to the manufacture of ammonium bifluoride, and has for its principal object to provide a simple, practical and cheap method of producing ammonium bifluoride from fluosilicic acid or silicon tetrafluoride. More particularly, it relates to the conversion of silicon tetrafluoride found in waste gases produced in the processing of phosphates to ammonium hydrogen fluoride.

It is known that when ammonia and hydrogen fluoride are brought together in the proportions of one mole of ammonia to two moles of hydrogen fluoride, under proper conditions, solid ammonium bifluoride ($NH_4HF_2$) is produced. Bozarth (U.S. 2,156,273) has disclosed a process whereby $NH_3$ and $HF$ are brought together, in exactly the proportions required to produce $NH_4HF_2$ at temperatures above the melting point of $NH_4HF_2$ (about 125° C.), the reaction goes to completion and the liquid product is recovered. Apart from the cost, this may be a satisfactory process for the production of ammonium acid fluoride. However, the process uses hydrofluoric acid as a raw material which is relatively expensive as well as corrosive and dangerous to handle.

McClenahan has disclosed (U.S. 2,446,484) a process whereby ammonium bifluoride is produced by heating ammonium fluoride at 125° C. in an atmosphere of ammonia to inhibit the sublimation of the ammonium acid fluoride. The reaction is represented in the following equation:

(1) $\qquad 2NH_4F \rightarrow NH_4HF_2 + NH_3$

The presence of an atmosphere of ammonia gas may inhibit the sublimation of ammonium bifluoride, although it is difficult to understand just why it should. However, there is no doubt that an ammonia atmosphere will tend to reverse the reaction.

The present invention provides a means of converting the normal ammonium fluoride ($NH_4F$) to ammonium acid fluoride ($NH_4HF_2$) without undue loss of ammonia or fluorine.

In order to accomplish this, an aqueous solution of fluosilicic acid ($H_2SiF_6$) is reacted with ammonium fluoride or a mixture of ammonium fluoride and sodium or potassium fluoride to produce ammonium acid fluoride in solution and a solid alkali silicofluoride in accordance with the following reaction:

(2) $\quad H_2SiF_6 + 4NH_4F \rightarrow (NH_4)_2SiF_6 + 2NH_4HF_2$
(3) $\quad H_2SiF_6 + 2NH_4F + 2NaF \rightarrow Na_2SiF_6 + 2NH_4HF_2$ Although the alkali silicofluorides are relatively insoluble in concentrated aqueous solutions of ammonium acid fluoride, the amount of water in the system should be limited so that substantially all of the alkali silicofluoride precipitates. The ammonium acid fluoride is recovered as a solid by evaporating the solution.

An alternate method of carrying out the process of the present invention is to react fluosilicic acid with the alkali and/or ammonium fluorides in relatively dilute solutions and then remove the excess water by evaporation. Aqueous solutions of the fluorides can be used instead of the solid salts but in this case additional water will be evaporated. If aqueous solutions of the alkali fluorides are used, it is preferred to use concentrated solutions.

The alkali silicofluorides produced in the above reaction can be recovered and sold as such or they may be converted into alkali fluorides by reaction with ammonia gas or ammonium hydroxide according to the following reactions:

(4) $\quad (NH_4)_2SiF_6 + 4NH_3 \rightarrow 6NH_4F + SiO_2 \cdot xH_2O$
(5) $\quad Na_2SiF_6 + 4NH_3 \rightarrow 2NaF + 4NH_4F + SiO_2 \cdot xH_2O$ These reactions are carried out at preferably about 80° C. in order to produce a more granular precipitate of hydrated silica and obtain a slurry which is easy to filter. At lower temperatures, the silica is smaller and more gelatinous and is consequently more difficult to filter. At higher temperatures, the ammonia loss is greater unless a closed system is employed. The preferred range is 50–95° C. Slow addition of ammonia is also conducive to formation of a more readily filter product.

When sodium fluoride is formed in the system, the amount of wash water used will be much higher because of the low solubility of sodium fluoride in water. If the silica is to be used for insecticidal purposes, it will desirably contain some sodium fluoride. Thus, a minimum wash may remove enough soluble fluoride to maintain proper balance in the system and still yield a fluoride-containing silica.

The ammonium or alkali metal fluoride is recycled to the system for conversion to ammonium acid fluoride as per Equation 2 or 3 above. Thus, ammonium fluoride is regenerated and the only reactants used up are fluosilicic acid and ammonia. Since 6 mols of ammonium fluoride are formed in Reaction 4 for each 4 mols used in Reaction 2, some ammonium fluoride or ammonium silicofluoride may be removed from the system in a cyclic process to keep the system in balance. However, this can be avoided, since, as explained below, evaporation of aqueous ammonium fluoride solutions converts part of the ammonium fluoride to ammonium acid fluoride. By controlled evaporation, it is possible to keep the system in balance without removing any fluoride except as the acid fluoride product.

The silica produced in Reaction 2 is extremely fine and is useful as an insecticide, a filler, a flatting agent, or other agent for which sub-micron sized silicas are adapted.

In the manufacture of superphosphate and phosphoric acid by treatment of phosphate rock with sulfuric acid, gases are evolved containing hydrofluoric acid, silicon tetrafluoride and other vapors which offer an excellent starting material for the manufacture of ammonium bifluoride by the process of the present invention. In addition to this, fluosilicic acid can be produced in an economical manner by the reaction of sulfuric acid and low grade fluorspar or by the reaction of fluorspar with sulfur dioxide in the temperature range of 400° to 750° C.

It is known that when aqueous solutions of ammonium fluoride are evaporated, the ammonium fluoride is partially converted into ammonium acid fluoride and ammonia gas is liberated. The resulting aqueous solution of ammonium fluoride and ammonium bifluoride can be used in the process of the present invention. Also solid ammonium fluoride may be heated to temperatures in the range of 100° to 125° C. and the resulting mixture of ammonium fluoride and ammonium acid fluoride can be used in the process of the present invention.

The following examples are present in order to afford a clearer understanding of the invention, but they are given as illustrative only without any intention to limit the invention thereto:

Example 1

148 parts of $NH_4F$ are added to 624 parts of 30% $H_2SiF_6$ (187 parts $H_2SiF_6$). The slurry is stirred for two hours at 25° C. The slurry is filtered at 25° C. to remove 149 parts of $(NH_4)_2SiF_6$. The filtrate is evaporated to remove 300 parts of water. The slurry is then cooled to 25° C. and stirred for two hours. The slurry is filtered at 25° C. to remove 27 parts of $(NH_4)_2SiF_6$. A total of 176 parts of $(NH_4)_2SiF_6$ are obtained. This is a yield of 98.99% based on the reagents used. The filtrate is evaporated to dryness by the removal of 180 parts of water. 116 parts of ammonium bifluoride are obtained containing 98.5% $NH_4HF_2$ and 1.5% $(NH_4)_2SiF_6$.

119.8 parts of $(NH_4)_2SiF_6$ are added to 440 parts of water. The solution is heated to 80° C. and 55 parts of $NH_3$ are added. The slurry is filtered at 25° C. to remove 40 parts $SiO_2$ as hydrated silica. The filtrate contains 148 parts of $NH_4F$ which can be used in the next cycle.

*Example II*

36 parts of 30% $H_2SiF_6$ (11 parts $H_2SiF_6$), 105 parts $(NH_4)_2SiF_6$ are added to 415 parts of water. The solution is heated to 80° C. and 57 parts of $NH_3$ are added. The slurry filtered at 25° C. to remove 40 parts $SiO_2$ as hydrated silica. The solution is evaporated to remove 28% parts of water and 23 parts of $NH_3$. The solution is composed of 9 parts $NH_4F$, 46 parts $NH_4HF_2$ and 152 parts water. 288 parts of 30% $H_2SiF_6$ (86.5 parts $H_2SiF_6$) are added to this solution. The slurry is stirred for two hours at 25° C. The slurry is filtered at 25° C. to remove 87 parts of $(NH_4)_2SiF_6$. The filtrate is evaporated to remove 175 parts of water. The slurry is stirred for two hours at 25° C. and filtered at 25° C. to remove 18 parts of $(NH_4)_2SiF_6$. A total of 105 parts of $(NH_4)_2SiF_6$ are obtained. This is a yield of 98.6% based on the raw materials used. The filtrate is evaporated to dryness to remove 180 parts of water. 116 parts of ammonium bifluoride is obtained containing 98.5% $NH_4HF_2$ and 1.5% $(NH_4)_2SiF_6$.

*Example III*

480 parts of 30% $H_2SiF_6$ (144 parts $H_2SiF_6$) are added to 84 parts $NaF$ and 74 parts $NH_4F$. The slurry is evaporated to remove 230 parts of water. The slurry is cooled to 25° C. and stirred for two hours. The slurry is filtered at 25° C. to remove 176 parts of $Na_2SiF_6$. This is a yield of 94% based on the raw materials used. The solution is evaporated to dryness to give 126 parts of solid which contained 91% $NH_4HF_2$ and 9% $Na_2SiF_6$.

*Example IV*

480 parts of 30% $H_2SiF_6$ (144 parts $H_2SiF_6$) are added to 116 parts $KF$ and 74 parts $NH_4F$. The slurry is evaporated to remove 167 parts of water. The slurry is cooled to 25° C. and stirred for two hours. The slurry is filtered at 25° C. to remove 218 parts $K_2SiF_6$. The filtrate is evaporated to dryness to give 116 parts of solid which contained 99% $NH_4HF_2$ and 1% $K_2SiF_6$.

I claim:

1. The method of making ammonium acid fluoride comprising admixing concentrated fluosilicic acid and ammonium fluoride in stoichiometric quantities to form a concentrated solution of ammonium acid fluoride containing solid ammonium silicofluoride, filtering to remove said solid and evaporating the filtrate to dryness, thereby yielding highly pure ammonium acid fluoride as a product.

2. The method of recovering very fine silica and ammonium acid fluoride from fluosilicic acid comprising the steps of admixing in concentrated solution stoichiometric quantities of fluosilicic acid and ammonium fluoride to obtain a slurry of solid ammonium silicofluoride in strong ammonium acid fluoride solution, separating said solid from the solution, evaporating said solution to yield ammonium acid fluoride, slowly mixing the ammonium silicofluoride with aqueous ammonia at a temperature of about 50–95° C. to form finely divided silica suspended in concentrated aqueous ammonium fluoride solution and recovering said silica from said solution, mixing said solution with an additional quantity of fluosilicic acid and repeating the foregoing sequence of steps.

3. The cyclic process for producing ammonium acid fluoride and finely divided silica from fluosilicic acid comprising the steps of: (1) admixing concentrated fluosilicic acid with concentrated ammonium fluoride obtained in step (5) below, thereby yielding ammonium silicofluoride suspended in concentrated aqueous ammonium acid fluoride; (2) separating the solid ammonium silicofluoride; (3) evaporating the remaining solution to yield solid ammonium acid fluoride; (4) admixing the solid ammonium silicofluoride slowly into aqueous ammonia at a temperature of about 50–95° C.; (5) filtering the resulting slurry to remove the silica, yielding a concentrated solution of ammonium fluoride; (6) partially evaporating the ammonium fluoride solution to concentrate it and convert a portion of the ammonium fluoride to ammonium acid fluoride; (7) and recycling the resulting solution to step (1) above.

4. The method of converting fluosilicic acid to finely divided silica and ammonium acid fluoride comprising the steps of: (1) admixing in concentrated solution fluosilicic acid and ammonium fluoride to form a slurry of ammonium silicofluoride in concentrated ammonium acid fluoride; (2) filtering said slurry to remove the solid from its mother liquid; (3) evaporating said mother liquor to yield ammonium acid fluoride; (4) dispersing the solid ammonium silicofluoride slowly and at a temperature of about 70–80° C. into concentrated aqueous ammonia, thereby forming finely divided silica dispersed in concentrated ammonium fluoride solution; (5) filtering to remove said silica; (6) at least partially evaporating the remaining solution to convert approximately one-third of the ammonium fluoride to ammonium acid fluoride and returning the resulting concentrated solution to step (1) above.

5. The process for making ammonium acid fluoride comprising mixing fluosilicic acid with twice its molar equivalent of ammonium fluoride and twice its molar equivalent of an alkali fluoride of the group consisting of ammonium fluoride, sodium fluoride, potassium fluoride and mixtures thereof in concentrated solution, thereby forming insoluble alkali silicofluoride in ammonium acid fluoride solution, filtering to remove the insoluble silicofluoride, and evaporating the filtrate to dryness to recover the ammonium acid fluoride as a product.

6. The process for making ammonium acid fluoride comprising mixing fluosilicic acid with twice its molar equivalent of ammonium fluoride and twice its molar equivalent of an alkali fluoride of the group consisting of ammonium fluoride, sodium fluoride, potassium fluoride and mixtures thereof in concentrated solution, thereby precipitating insoluble alkali silicofluoride in ammonium acid fluoride solution, filtering to remove the insoluble alkali silicofluoride, evaporating said solution to yield solid ammonium acid fluoride dispersing the silicofluoride in water, slowly adding to such dispersion at a temperature of 50–95° C. sufficient $NH_3$ to convert the silicofluoride to insoluble silica and soluble alkali fluoride corresponding to the fluoride used in the initial step, filtering to remove the silica and recycling said alkali fluoride solution to the initial step.

7. The process for making ammonium acid fluoride comprising mixing concentrated fluosilicic acid with double its molar equivalent of ammonium fluoride and double its molar equivalent of sodium fluoride, thereby precipitating sodium silicofluoride in ammonium acid fluoride solution, filtering to remove said sodium silicofluoride, evaporating the filtrate to dryness to recover ammonium acid fluoride, dispersing said sodium silicofluoride in water, slowly adding thereto at a temperature of 50–95° C. sufficient ammonia to convert the sodium silicofluoride to silica dispersed in an aqueous solution of sodium fluoride and ammonium fluoride, filtering to remove the silica, washing said silica free of sodium fluoride and recycling the filtrate to the initial step of the process for reaction with additional fluosilicic acid.

8. The process of claim 7 wherein the filtrate from the silica in the removal step is evaporated to the stage that substantially half of the ammonium fluoride is converted to ammonium acid fluoride prior to the recycling to the initial step of the process.

9. The cyclic process for producing ammonium acid fluoride and finely divided silica from fluosilicic acid comprising the steps of: (1) admixing concentrated fluosilicic acid with double its molar equivalent of ammonium fluoride and double its molar equivalent of an alkali fluoride of the group consisting of ammonium fluoride, sodium fluoride, potassium fluoride and mixtures thereof, thereby forming insoluble alkali silicofluoride suspended in ammonium acid fluoride solution; (2) separating said insoluble alkali silicofluoride; (3) evaporating the solid-free solution to yield solid ammonium acid fluoride; (4) stirring the solid alkali silicofluoride slowly into aqueous ammonia at a temperature of about 50–95° C., thereby forming finely divided silica dispersed in a mixed solution of ammonium fluoride, and alkali fluoride corresponding to the alkali silicofluoride formed in the initial step; (5) filtering to remove said finely divided silica; (6) partially evaporating the filtrate from the preceding step to concentrate it and convert a portion of the ammonium fluoride to ammonium acid fluoride, the amount of ammonium fluoride retained unchanged in the solution being the amount needed for recycling to the initial step; and (7) recycling said solution to the initial step for reaction with additional fluosilicic acid.

References Cited in the file of this patent

UNITED STATES PATENTS

| | | |
|---|---|---|
| 1,235,552 | Chappell | Aug. 7, 1917 |
| 2,728,634 | Miller | Dec. 27, 1955 |
| 2,780,522 | Gloss et al. | Feb. 5, 1957 |
| 2,780,524 | Gloss et al. | Feb. 5, 1957 |

OTHER REFERENCES

Chemical Trade Journal and Chemical Engineer, vol. 112, p. 369, April 9, 1948, "Synthetic Cryolite."